United States Patent Office 3,014,087
Patented Dec. 19, 1961

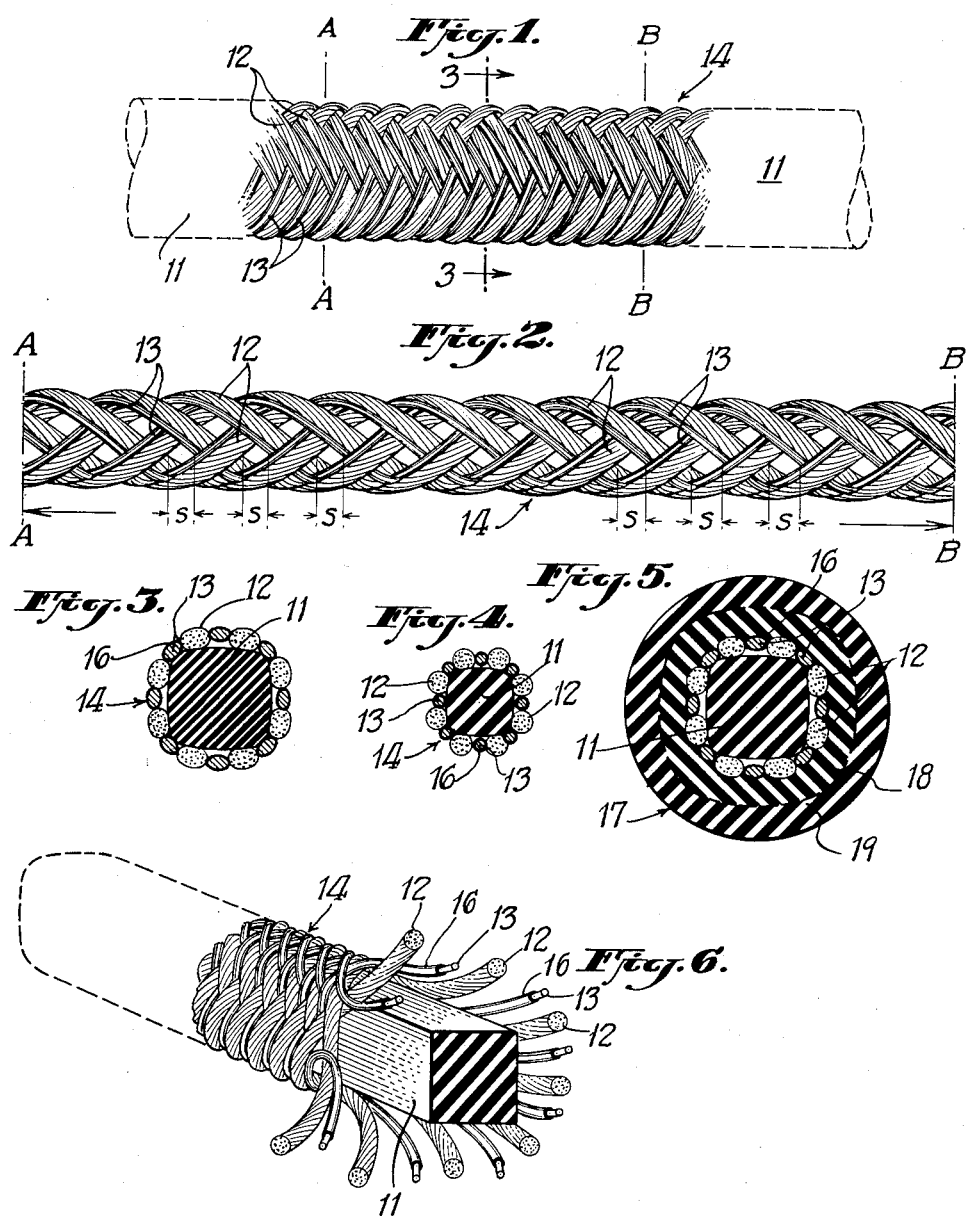

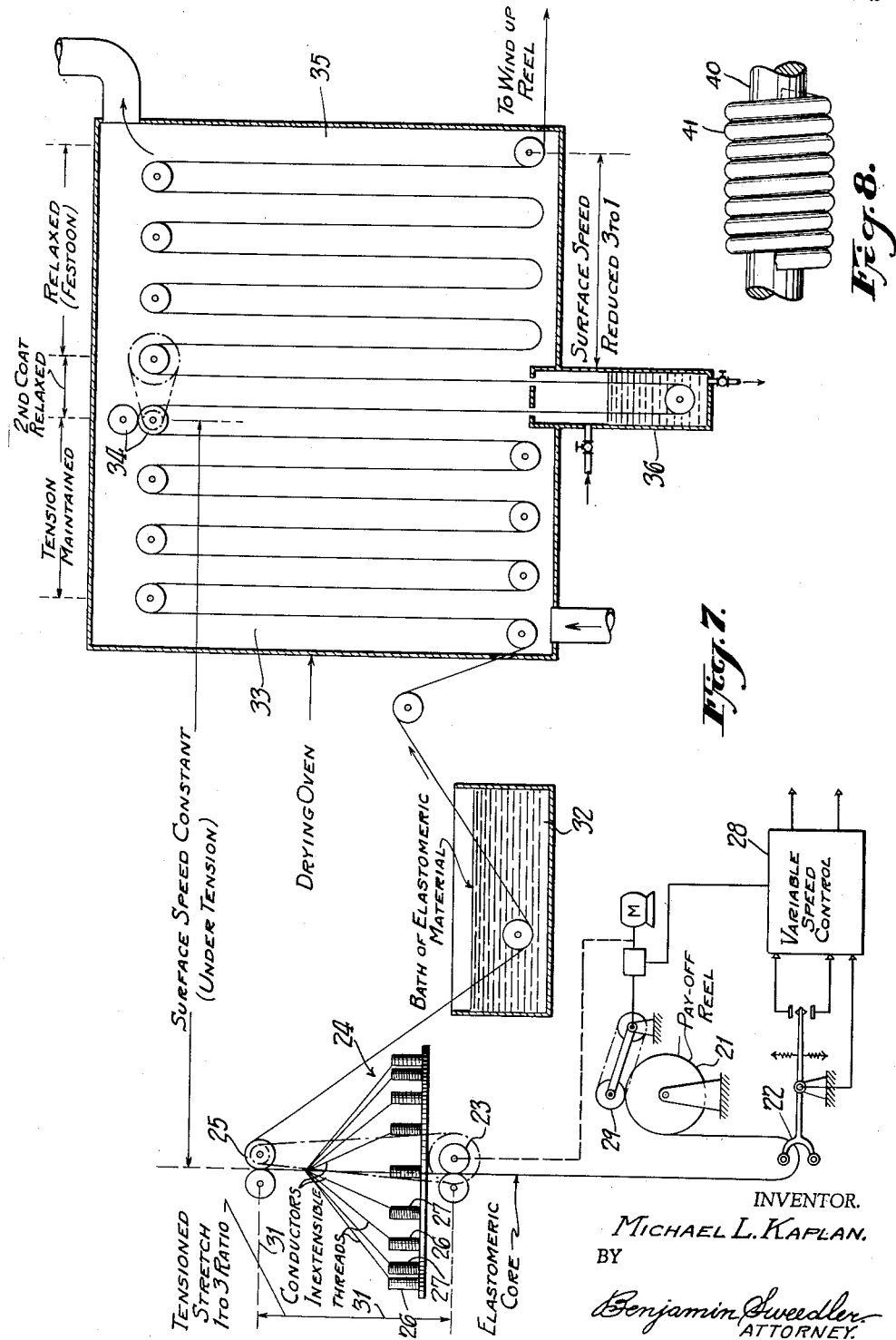

3,014,087
EXTENSIBLE ELECTRIC CABLES
Michael L. Kaplan, 28 Vaughn Ave., New Rochelle, N.Y.; Philip Kaplan and National Bank of Westchester, White Plains, N.Y., executors of the estate of said Michael L. Kaplan, deceased
Filed Dec. 17, 1957, Ser. No. 703,370
3 Claims. (Cl. 174—69)

Extensible electric cables, in which a rubber core has associated therewith an electrical conductor wound about the core, usually in the form of a herring-bone or helical winding on the core, are well known. Such extensible cables are disclosed, for example, in U.S. Patents 2,013,211 of September 3, 1935, 1,944,390 of January 23, 1934, and 1,654,508 of December 27, 1927.

In such extensible cables as heretofore produced, to the best of my knowledge and belief, in every case, the rubber core served the double function of permitting stretch of the cable to take place and causing such cable to return to the relaxed state.

One major difficulty encountered with such cables is that the stretch was not controlled; at times the cable would be stretched beyond the elastic limit of the core or to an extent to place undesirable stresses on the conductor resulting in a breaking or snapping of the conductor.

It is among the objects of the present invention to provide a stretch or extensible cable having a built in control on the extent to which the cable may be stretched, thus minimizing, if not preventing, stretching of the cable to the point where undesirable stresses and strains are created on the components of the cable. Another object is to provide a novel method of producing such cables inexpensively, efficiently and economically. Still another object is to provide a stretch or extensible cable and a process of producing same, which cable has an outer insulating sheath impervious to moisture, the sheath having good heat resistance and resistance to vibration and shock. Still another object is to provide a process for producing such extensible cable having an elastomeric sheath efficiently and economically.

Other objects and advantages of the present invention will be apparent from the following detailed description thereof.

The extensible cable of this invention comprises an extensible core of elastomeric material, such as rubber, natural or synthetic, or extensible plastics, having braided thereon, while the core is extended to a predetermined extent, depending on the desired amount of stretch in the final product, a series of conductors and inextensible threads or yarns to form an interlocking braided sheath. After this braided sheath is formed on the stretched core, the tension on the extensible core is released, permitting it to return to its relaxed state, simultaneously causing the braided sheath formed to contract, forming a braided sheath about the core, which is extensible when the cable is again extended. The braided sheath, however, permits the cable to be extended to the point, and only to the point, of the original elongation of the braided sheath formed thereon. In other words, the inextensible textile threads which are a component of the braided sheath and the interlocking arrangement of the braid permit this braided sheath to be extended to the length, and only to the length, the sheath occupied when formed, and thus controls the extent of elongation of the cable. Thus the cable has a built in control on the amount or extent of elongation to which it may be subjected; it can be extended less but not substantially more than the length of the braided sheath when formed on the elastomeric core stretched to a predetermined point below the elastic limit of the core.

In a preferred embodiment of the invention, the cable produced as hereinabove described is provided with an insulating sheath covering the braided sheath. This insulating sheath is formed by applying successive layers of an extensible insulating material such as the rubbers and other suitable elastomeric plastics. It is important that the first layer of the elastomeric insulating material be applied when the cable is in the extended or stretched state. By so doing, the interstices and pores or openings within the braided sheath are filled and a good bonding of the insulating sheath with the braided sheath is obtained. Successive layers or coatings of insulating material are applied to the first layer after the cable containing the latter has returned to its relaxed state. By applying the first layer of the elastomeric insulating material to the cable while the latter is in the elongated or stretched state, approximately equal to the maximum elongation for which the cable is designed as hereinabove described and applying the successive layers to this first layer when the cable has returned to its relaxed state, a product is produced in which the insulating sheath is exceptionally well bonded to the braided sheath and the insulating sheath is durable and efficient for its intended purposes.

In the accompanying drawings forming a part of this specification and showing for purposes of exemplification preferred embodiments of the invention, without limiting the claimed invention to such illustrative embodiments;

FIGURE 1 is a fragmentary elevational view, on a greatly enlarged scale, showing a portion of the periphery of the cable in the relaxed state;

FIGURE 2 is a fragmentary enlarged elevational view showing the portion of the cable in FIGURE 1 between the lines AA and BB in the extended state;

FIGURE 3 is a vertical section through the cable of FIGURE 1 taken in a plane indicated by the lines 3—3 on FIGURE 1. FIGURE 3 shows the cable in the relaxed state;

FIGURE 4 is a similar vertical section through the cable of FIGURE 2. FIGURE 4 shows a section through the cable in the extended state;

FIGURE 5 is a vertical section through a preferred form of cable having an elastomeric insulating sheath on its periphery;

FIGURE 6 is a perspective view of the cable illustrating the interlocking or lock-type character of the inextensible threads and the insulated conductors braided to form the braided conducting sheath which controls the extensibility of the cable;

FIGURE 7 is a diagrammatic layout of equipment for producing the cable of FIGURE 6 and shows the steps involved in the production of this cable; and FIGURE 8 is a perspective view of a modification of the invention involving wrapping a cable about a mandrel and while so coiled curing the elastomeric sheath on the cable, thus producing a helical extensible cable which can first be unwound without stretch and then after it is unwound can be stretched.

Referring first to FIGURE 1, 11 indicates a core which may be circular or polygonal in cross section and is constituted of any suitable elastomeric material which can expand and contract, such, for example, as natural rubber, the synthetic rubbers, Buna N, Buna S, neoprene and elastomeric plastics. This core is extended a controlled amount depending upon the intended use of the cable and the extent of extensibility desired which usually is within the range of from 50% to about 500%, i.e., the cable may be stretched to increase its length from one and a half to five times its original length. While under tension in this extended state, a braided sheath made up of a plurality of conductor wires, desirably insulated conductor wires, and inextensible textile threads, is formed on the core.

In FIGURE 1, the inextensible textile threads are indicated by the reference character 12 and the conductor wire by the reference character 13. It will be noted from this figure that the threads 12 and the conductor wire 13 are so braided that each wire 13 passes under two threads 12, then over the next two threads, etc. as the wires and threads are braided to form the sheath 14. Similarly, the threads pass under two adjacent wires, then over two adjacent wires, etc. This construction provides what may aptly be characterized as a lock-type braid controlling the extent of the extensibility of the cable. Thus the cable can be extended to cause the braided sheath 14 to open a maximum distance indicated by the spaces S on FIGURE 2 of the drawings. When in the relaxed state, the threads 12 and wire 13 on the periphery of the core abut, i.e., these spaces S are no longer perceptible.

The interbraided arrangement described controls the extent of the extensibility of the cable. In the construction described, the cable can be stretched to a maximum distance equal to the extent of elongation of the interlocking braided sheath 14 formed thereon; the stretching produces the spaces S. When the tension on the core 11 is released, the core functions to contract the braided sheath 14, the braided construction permitting the sheath to contract with elimination of spaces S when the core 11 reaches its completely relaxed state. Thus, by stretching the core 11 to a predetermined extent, say 50%, 100%, 200%, etc., and producing the braided sheath 14 thereon, while in this stretched condition, the braided sheath controls the amount of elongation to which the finished cable can be subjected. Once the sheath 14 is stretched to the same extent as the distance occupied by the sheath when formed on the extensible core 11, it cannot be stretched, as a practical matter, beyond this point because the interlocking braided construction prevents this. The core 11 functions to return the stretched cable to its relaxed state. It is important to note it does not function to control the extent of elongation or extensibility. This, in the present invention, is controlled entirely by the braided sheath containing the inextensible threads.

The substantially inextensible threads 12 may be of nylon, rayon, Dacron, silk, mercerized cotton or asbestos. The tensile strength of the threads should be so chosen that the threads are strong enough for the intended purpose. Nylon threads are preferred because of their high tensile strength.

The conductors 13 may be of copper, nickel, chromium, silver, aluminum, or alloys of these metals. Desirably the conductor wires are insulated; the insulation is indicated at 16 in the drawings. For example, Sodereze wire, i.e., wire coated with polyurethane, which forms a flexible insulating film, is suitable. Also the Formvar (polyvinyl acetate) coated wires may be used. The Formvar insulated wires may be produced by passing the wire through a bath, then curing at about 700° F. and repeating to form the desired number of coats of Formvar, usually from 3 to 16. Teflon (polymerized tetrafluoro ethylene) coated wires may also be used in forming the braided sheath as well as conductor wires coated with insulating varnishes.

The use of insulated conductor wires in forming the braided sheath eliminates the necessity for providing a separate or additional insulating sheath for the cable. Even in the case of cables having an elastomeric insulating sheath bonded to the braided sheath, it is preferred to use insulated wire in forming the braided sheath, chiefly because the use of such insulated wire results in a better product, invariably meeting specifications for household and industrial uses.

The number and thickness of the conductor wires and inextensible threads employed to produce the braided sheath will vary depending upon the type of extensible cable manufactured. Existing braiding machines are usually designed to operate with 12, 16, 24 or 32 feeds (i.e. threads) simultaneously to produce a braided sheath. These machines may be employed to produce the extensible cable of this invention. 6, 8, 12 or 16 each of the inextensible textile or asbestos threads and conductor wires may be simultaneously fed to the core under tension so that it is stretched to the desired predetermined extent and the braided sheath produced continuously on the stretched core as the latter moves continuously under tension through the machine.

The number of windings of inextensible threads and hence also of the conductor wires (the same number of each is usually employed) per relaxed inch of cable, employed in producing the sheath is expressed by the following equation:

$$N = \frac{S(W+D)}{3.3Y}$$

In this equation:

$N$ = the number of windings of inextensible threads and hence also of the conductor wires (substantially the same number of each is used) per relaxed inch of cable.

$S$ = the desired amount of stretch expressed in percent elongation of the cable from the relaxed state; thus, if the amount of stretch is such as to extend the cable to double its relaxed length $S=100$, if to triple its relaxed length $S=200$, if to one and one-half its relaxed length $S=50$.

$Y$ = diameter of elastomeric core in the case of a cylindrical core and the equivalent of the diameter, i.e., cross-sectional extent in the case of a core polygonal in cross-section; $Y=1$ for $\frac{1}{16}$ inch core and is proportionately larger for a core of larger diameter or larger cross-sectional extent and proportionately smaller for a core of smaller diameter or smaller cross-sectional extent; thus for a $\frac{1}{8}$ inch diameter core $Y=2$, for a $\frac{1}{4}$ inch diameter core $Y=4$ and for a $\frac{1}{32}$ inch diameter core $Y=\frac{1}{2}$.

$W$ = the diameter of the wire $D$ = the denier of the inextensible textile threads. For No. 40 wire (diameter 3.1 mils) and for 100 denier textile threads, the sum of $W+D$ is 1. $W+D$ is proportionately smaller or larger for larger or smaller diameter wires and for larger or smaller denier threads respectively; thus for 34 wire (diameter 6.3 mils) and 200 denier threads, $W+D=2$, etc. It will be understood that when using wire or threads, which are not circular in cross-section, the dimension thereof corresponding to the diameter of a cylindrical wire or thread of equivalent thickness is taken as the diameter for purposes of calculating the number of windings of threads and conductor wires per relaxed inch of cable in accordance with the above formula.

Thus, if a cable having a maximum elongation of 200% is desired, employing a rubber core having a diameter of $\frac{1}{16}$ inch and 100 denier nylon and copper wire of size 40, 60 windings of the copper wire and the nylon are applied per relaxed inch of cable. If a cable having a maximum elongation of 100% is desired, using the same type of nylon thread and copper conductor wire, 30 windings of each of the nylon thread and the conductor wire are applied per relaxed inch of cable. If a maximum elongation of 400% is desired, 120 windings of the conductor wire, size 40, and the nylon thread of 100 denier are applied per relaxed inch of rubber core.

If the diameter of the conductor wire is doubled and also the diameter of the nylon thread, 30 windings of such wire and nylon thread are applied per relaxed inch of rubber core of $\frac{1}{16}$ inch diameter, and a cable having a maximum elongation of 100% is obtained.

By forming the braided sheath as hereinabove described, the following important unexpected advantages are obtained:

(1) A tight sheath construction results due to its formation in the extended state of the core and subsequent return of the core to its relaxed state, thus minimizing, if not preventing, slipping or floating of the braided sheath relative to the core.

(2) The interlocking construction of the inextensible threads in the braided sheath controls the amount of stretch to which the cable may be subjected; these threads also act as a strain relief for the conductor wire.

(3) The braided sheath 14 subjects the elastomeric core 11 to less wear and chafing in normal use of the cable than would be the case if helical or herring-bone constructions of conductor wires were used as was heretofore conventional.

(4) The braided sheath 14 functions as a heat dissipator in that the threads 12 space the conductor wires and the latter have substantially their entire surface exposed, i.e., not covered by the threads 12. In those cases where the cables are designed for uses involving substantial heat generation, e.g., relatively high amperage cables, threads 12 desirably are of asbestos and the cable is constructed as shown in FIGURES 1, 2 and 3 without an external insulating sheath such as is shown in FIGURE 5. The construction of FIGURES 1 to 4 eliminates the need for insulating covers or sheaths, with consequent marked saving in material and labor in making such extensible cables.

(5) For many uses, particularly where high safety standards must be met, cables having an elastomeric insulating sheath 17 are preferred. The braided sheath 14 results in a firmer and better bonding of the insulation sheath 17 to the cable as will be described hereinafter.

Insulation sheath 17 may be of any elastomeric material such as natural latex, natural rubber, synthetic latex and rubber such as the butadiene styrene copolymers, butadiene acrylonitrile copolymers, polyvinyl chloride, silicone resins, polyethylenes, etc. The material should have the ability to stretch sufficiently, without injury to the insulation sheath, to permit the cable to be extended to the maximum length for which it is designed as hereinabove described, i.e., an extended length equal to the stretched state of the cable when the sheath 14 is formed thereon. The insulation layer 17 may be flow-coated onto the braided sheath or extruded thereonto, in two or more layers. In FIGURE 5, two layers 18 and 19 are shown on a greatly enlarged scale, but it will be understood any desired number of layers may be formed, three, four or more.

It is important that the first layer 18 be formed while the core 11 and braided sheath 14 are in the extended state, substantially the same in degree of elongation as when the sheath 14 is braided. In this way the elastomeric insulating material while liquid or molten fills the pores and interstices of the sheath 14. While in this extended state, the first layer of insulating material is set or cured. Thereafter the tension on the partially coated product is relieved and a second coating 19 of elastomeric insulating material applied while the partially coated product is in the relaxed state. The coating thus applied is set or cured and successive coatings applied and set or cured until an insulating sheath 17 of the desired thickness has been formed.

In FIGURE 7 is shown diagrammatically a layout of equipment for producing the extensible cable of the present invention. In this figure 21 is a reel of elastomeric core material which passes through a slack take up device 22 of any well known type to the first of a pair of feed rolls 23, thence through a conventional braiding machine 24 and a second pair of feed rolls 25 driven at a speed, say three times the rate of feed of the feed rolls 23. In this way the core is stretched 300% as it passes through the braiding machine 24 and the braided sheath 14 is formed on the stretched core by the braiding of the conductors and inextensible threads fed from the spools 26 and 27 respectively.

As shown diagrammatically in the drawing, a conventional variable speed control 28 controls the operation of the pay-off reel 21 to continuously supply core material to the feed rolls 23. The rate of feed of the core from reel 21 is controlled by the pay-off feed roll 29 through the variable speed control mechanism so as to always provide some slack below feed rollers 23, but to prevent too large an excess from accumulating. The core material below the feed rollers 23 is in the relaxed state.

The feed rollers 25 are driven from the motor M which also effects actuation of the core material feed from pay-off roller 21 and the feed rollers 23 at a peripheral speed one-third that of the feed rollers 25. The driving connections from feed rollers 23 to feed rollers 25 are indicated diagramatically by the lines 31. This differential in peripheral speeds between rollers 23 and 25 causes a 300% elongation of the core as it passes through the braiding machine 24. This elongation is of course illustrative; any desired elongation may be effected depending on the type of extensible cable desired. As the feed mechanism for the core to effect stretching thereof while braiding the sheath 14 thereon, may be of any desired type and the braiding machine may also be of any well known type, it is believed unnecessary to further describe this equipment.

The braided core, particularly when the sheath 14 is made employing insulated conductors as hereinabove described, may be permitted to return to its relaxed state, then cut into suitable lengths and provided with suitable terminals such as spade, jacks or clip terminals. The resultant products embody one modification of this invention.

In accordance with another embodiment, the core having the braided sheath thereon, while still in the extended state, is passed through a bath 32 of elastomeric material so that it is flow-coated while the braided sheath is extended to substantially its maximum extent. From this bath the thus coated step-product passes through the first stage 33 of a drying oven where the coating applied is set or cured. The step-product passing through the first stage is maintained under tension, i.e. in the extended state until it reaches the feed rollers 34. Once it passes the feed rollers 34 the tension is released. Feed rollers 34 are driven at the same peripheral speed as rollers 25 so that the sheathed core is maintained under uniform tension while the braided sheath 14 is formed thereon and while passing from feed rollers 25 up to and through feed rollers 34; thereafter the feed of the partially coated product is at a rate corresponding to the rate of feed from the pay-off reel 21 so that the step-product is no longer under tension. The wind-up reel from the second stage 35 of the dryer may be driven to feed the step-product through the second stage 35 of the dryer; this step-product is fed in the relaxed state. Alternatively a pair of feed rolls (not shown) may be provided for this purpose.

From the feed rollers 34, the partially coated product passes through a second coating bath 36 of the same composition as bath 32. From bath 36 the coated product passes through second stage dryer 35. It will be noted the second coating layer is applied while the step-product is in the relaxed state. Two or more additional coatings may be applied in the same manner with an intermediate curing or setting treatment after each application of elastomeric insulating coating.

A suitable and preferred material for forming the insulating sheath 17 is natural latex. A composition containing 60% latex and 40% water desirably is used to form the first layer 18. Thickened solutions of latex may be used for the subsequent coatings. Natural gums and other colloidal agents may be added as thickeners. After application, the latex coatings are vulcanized as well known to produce an insulated sheath 17 bonded to the braided sheath 14, the insulating sheath having high elasticity.

Any desired number of cores having braided sheaths thereon, two, three, four or more, may be flow-coated as above described as a unit to produce a product having two, three, four or more conductors, each consisting of a core and braided sheath enclosed in one and the same insulating elastomeric sheath.

Instead of natural latex, a synthetic latex or rubber hereinabove disclosed may be used. Plastisols such as polyvinyl chloride may be employed where a stretch of not more than 200% is desired in the final product. When applying such plastisols, the temperature during the drying or setting thereof should be maintained below 400° F. Also if desired after drying at below 400° F., the coating may be quenched in cold water before applying a succeeding coating layer.

Extensible cables thus produced having insulating sheaths of elastomeric material are cut to the desired lengths and provided with suitable terminals.

In the modifications of FIGURES 1 to 4, an outer braid of textile yarns may be applied for decorative purposes. Also a plurality of the units of FIGURES 1 to 4 may have formed thereon a single outer sheath of textile yarn to produce a multiple cable.

The extensible cables of this invention have many uses. They may be used as "Coil Cords" on telephones. By wrapping a cable about a mandrel 40 and while so coiled curing the elastomeric sheath thereon, a helical extensible cable may be produced which can first be unwound without stretch and then after it is unwound can be stretched. In FIGURE 8 the helices of such helical extensible cable are indicated by the reference numeral 41. Thus a 5 inch coil of this invention made in coil form would extend to 60 inches. This compares with the 15 inch length of "Coil Cords" now available which stretch to about 58 inches. The extensible cable of this invention is useful generally to replace electric conductors where the ability of the conductor to stretch or be elongated is desirable.

It will be understood the present invention is not to be limited to the embodiments herein described except as is set forth in the appended claims.

Thus for example, as noted, the insulation layer 17 can be formed by extruding onto the braided sheath an elastomeric insulating material such as polyethylene, neoprene, silicones, natural rubber, etc., the first layer thus formed in the extrusion process being applied to the stretched braided sheath and the subsequent layers applied by extrusion while the braided sheath is in the relaxed state. Moreover the exterior coating or sheath, as the case may be, may be of any desired color.

In still another modification, the cable having the insulation coating 17, formed either by flow-coating or extrusion, as hereinabove described, is wound on a mandrel 40 (FIGURE 8) after application of the last layer forming the complete insulation coating 17 but before the curing of this last layer, the latter is cured while thus wound on the mandrel. A coil cable results which retains its coil state; when such cable is extended the coil first unwinds and thereafter the cable stretches.

What is claimed is:

1. An extensible electric cable comprising an elastomeric core, a braided sheath covering said core, said sheath snugly engaging and covering said core when said core is in the relaxed state and being constituted of individual conductor wires braided with substantially inextensible individual textile threads with the conductor wires and the threads in side by side contacting relation and in interlocking engagement, said braided sheath being formed on said core while said core is stretched to a predetermined extent at least equal to 50% of the relaxed length of said core but below its elastic limit and thus said sheath is extensible to a maximum length below the maximum length to which the core may be extended before snapping, which maximum length is approximately the same as the length of said core when in the stretched condition during the formation of said sheath thereon, the said sheath thus controlling the extensibility of said cable and said elastomeric core effecting return of said cable to the relaxed state when forces causing stretching of the cable are no longer applied.

2. An extensible electric cable as defined in claim 1, in which the core is of rubber, the conductor wires have a coating of insulation thereon and the cable has an outer sheath bonded to the braided sheath, said outer sheath consisting of elastomeric insulating material.

3. An extensible electric cable as defined in claim 2, in which the cable is in the form of a helical coil, which coil can first be unwound without stretching and after it is unwound can be stretched by the application of tension thereto.

References Cited in the file of this patent

UNITED STATES PATENTS

| | | |
|---|---|---|
| 2,013,211 | Herkenberg | Sept. 3, 1935 |
| 2,257,649 | Pierce | Sept. 30, 1941 |
| 2,298,748 | Brown | Oct. 13, 1942 |
| 2,609,417 | Cox et al. | Sept. 2, 1952 |
| 2,652,444 | Dansand | Sept. 15, 1953 |
| 2,759,990 | Bean | Aug. 21, 1956 |
| 2,865,978 | Modrey | Dec. 23, 1958 |

FOREIGN PATENTS

| | | |
|---|---|---|
| 29,645 | Great Britain | Dec. 31, 1904 |
| 104,401 | Great Britain | Mar. 8, 1917 |
| 750,824 | France | June 6, 1933 |
| 594,459 | Great Britain | Nov. 12, 1947 |
| 976,516 | France | Oct. 25, 1950 |